(12) United States Patent
Takada et al.

(10) Patent No.: US 6,821,630 B2
(45) Date of Patent: Nov. 23, 2004

(54) POLYACETAL RESIN COMPOSITION AND METAL INSERT MOLDING

(75) Inventors: Miki Takada, Fuji (JP); Mitsunori Matsushima, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 0 days.

(21) Appl. No.: 10/352,020

(22) Filed: Jan. 28, 2003

(65) Prior Publication Data

US 2003/0148117 A1 Aug. 7, 2003

(30) Foreign Application Priority Data

Feb. 4, 2002 (JP) ........................................ 2002-026442

(51) Int. Cl.[7] .............................................. B32B 15/08
(52) U.S. Cl. .......................... 428/450; 525/474; 525/398
(58) Field of Search ................................. 525/474, 398; 428/450

(56) References Cited

U.S. PATENT DOCUMENTS 5,183,858 A * 2/1993 Sasaki et al. ................ 525/308
5,889,102 A * 3/1999 Haack et al. ................ 524/494

FOREIGN PATENT DOCUMENTS

| JP | 3-14856 | 1/1991 |
| JP | 2000-265036 | 9/2000 |

OTHER PUBLICATIONS

Patent Abstracts of Japan, vol. 013, No. 372, Aug. 17, 1989 & JP 01 126359, May 18, 1989.

* cited by examiner

*Primary Examiner*—Kuo-Liang Peng
(74) *Attorney, Agent, or Firm*—Nixon & Vanderhye P.C.

(57) ABSTRACT

Tenacity of a high-molecular polyacetal resin is improved and stress relaxation thereof is also made to easily take place whereby there is provided a polyacetal resin composition in which a creep rupture life (creep characteristic) of polyacetal resin in a metal insert molding, etc. is significantly improved. (A) polyacetal resin having a melt index of 3.0 or less is compounded with (B) 0.05 to 3.0% by weight (in the composition) of silicone oil, (C) 0.1 to 5.0% by weight (in the composition) of elastomer and (D) 0.1 to 5.0% by weight (in the composition) of ultrahigh-molecular weight polyethylene.

7 Claims, 2 Drawing Sheets

POLYACETAL RESIN COMPOSITION AND METAL INSERT MOLDING

BACKGROUND OF THE INVENTION

1. Field of the Invention

The present invention relates to a polyacetal resin composition having a significantly improved creep rupture life (creep characteristic) of a polyacetal resin in a metal insert molding and the like and a molded article thereof.

2. Description of the Related Art

A polyacetal resin has such excellent properties as mechanical properties, thermal properties, electric properties, slidability, moldability, and dimensional stability of a molding and is widely used as a structural material or a mechanism element in electrical apparatuses, automobile parts and precision instrument parts.

Meanwhile, it is known that although the polyacetal resin is less liable to cause creep than other thermoplastic resins, it is subjected to creep rupture depending on the form of an article molded therefrom and a usage pattern of the molding. For example, in the case of a metal insert molding using the polyacetal resin, due to stress caused by molding distortion at the time of molding or aftercontraction of the polyacetal resin after molding, cracks may occur in a portion when the stress converges in a very short time or even the product itself may be broken.

For this reason, in reality, use of the polyacetal resin in a metal insert molding such as a through anchor which is an automobile part is often impossible and is very limited even if it is actually used.

To improve such a creep rupture, measures with respect to design of the shape of a molding have heretofore been primarily taken. However, measures with respect to design of the shape are basically limited. Therefore, as a fundamental improvement measure, development of a resin material having a significantly improved creep rupture life is strongly desired.

As such a polyacetal resin material having an improved creep rupture life, JP-A 2000-265036 shows a resin composition obtained by mixing a silicone oil and an elastomer with a polyacetal resin. The resin composition has a significantly improved creep rupture life, as compared with conventional polyacetal resin materials. However, the resin composition will have to be further improved and meet higher demands.

SUMMARY OF THE INVENTION

The present inventors have made intensive studies so as to solve the above problems. As a result, they have found that a creep rupture life in a metal insert molding or the like is unexpectedly improved by mixing trace amounts of silicone oil, elastomer and ultra high molecular weight polyethylene into a high molecular weight polyacetal resin. The present invention has been completed by this finding.

That is, the present invention relates to a polyacetal resin composition prepared by mixing (B) 0.05 to 3.0 wt % (in the composition) of silicone oil, (C) 0.1 to 5.0 wt % (in the composition) of an elastomer, and (D) 0.1 to 5.0 wt % (in the composition) of ultra high molecular weight polyethylene, into (A) a polyacetal resin having a melt index of 3.0 or less, and to a metal insert molding using the composition.

In other words, the composition of the invention comprises (A), (B), (C) and (D) in the specified contents.

DETAILED DESCRIPTION OF THE PREFERRED EMBODIMENT

Figure 1:
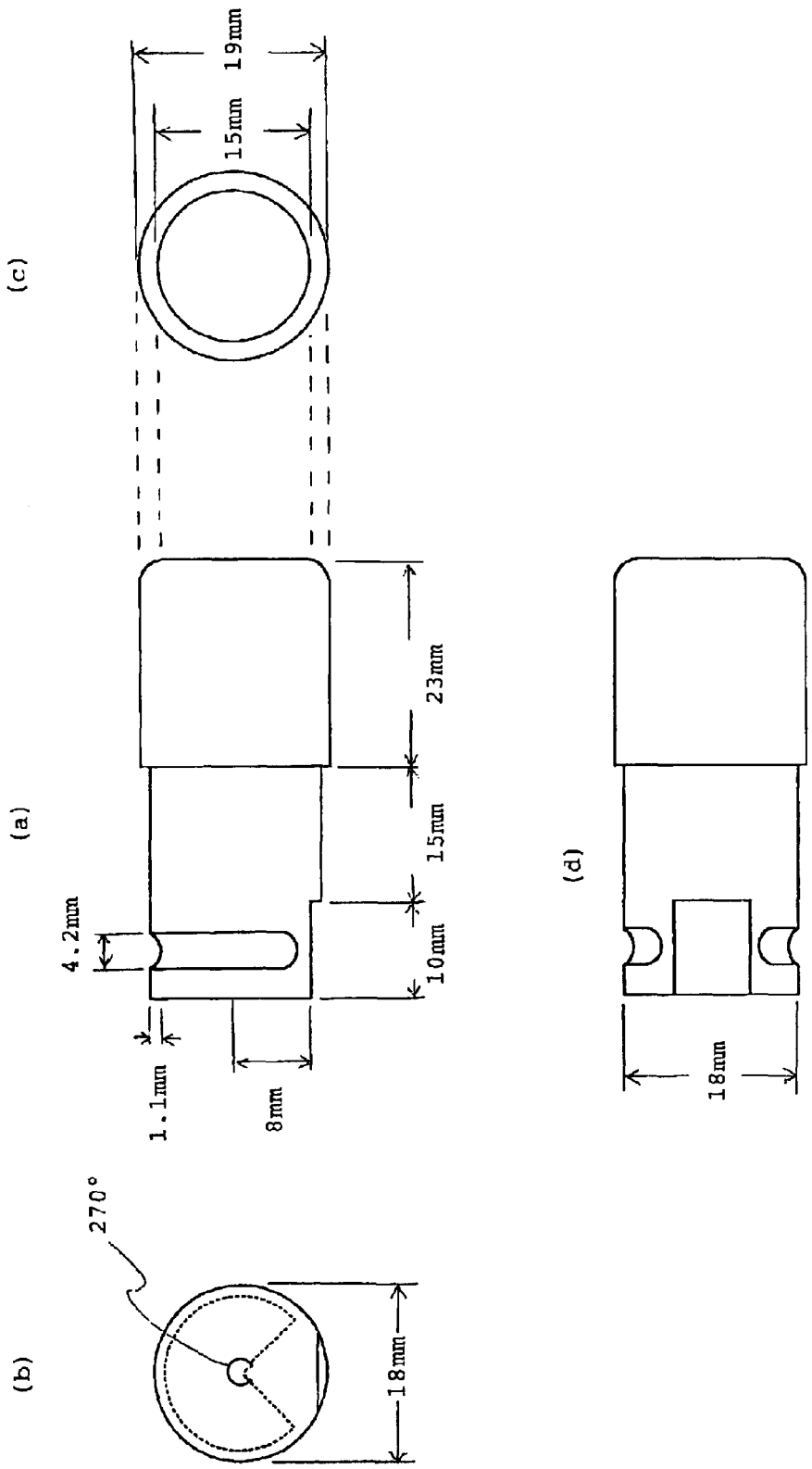
FIG. 1 is a diagram showing the shape of an insert metal used in Examples wherein (a) is a front view, (b) is a left side view, (c) is a right side view, and (d) is a top view.

Hereinafter, constituents of the present invention will be described. A polyacetal resin (A) in the present invention is a polymer compound containing an oxymethylene group ($-CH_2O-$) as a main recurring unit. The polyacetal resin includes a polyoxymethylene homopolymer and a polyacetal copolymer. The copolymer contains, in addition to the oxymethylene group, an oxyalkylene unit having about 2 to 6 carbon atoms, preferably about 2 to 4 carbon atoms (such as an oxyethylene group ($-CH_2CH_2O-$), an oxypropylene group or an oxytetramethylene group) as a constituent. Its amount is about 0.1 to 15 moles, preferably about 1 to 10 moles, based on 100 moles of the oxymethylene unit which is a main constitutional unit.

The polyacetal copolymer may comprise a plurality of components such as a copolymer comprising two components and a terpolymer comprising three components and may be a block copolymer or the like. Further, the polyacetal resin may have a branched structure or a crosslinked structure as well as a linear structure. In addition, terminals of the polyacetal resin may be stabilized through esterification with a carboxylic acid such as acetic acid, propionic acid or butyric acid. The degree of polymerization, degree of branching and degree of crosslinkage of the polyacetal resin are not particularly limited as long as the polyacetal resin is melt-moldable.

Preferable polyacetal resins include a polyoxymethylene homopolymer and a polyacetal copolymer (such as a copolymer comprising at least an oxymethylene unit and an oxyethylene unit). From the viewpoint of heat stability, the polyacetal copolymer is preferred.

The above polyacetal resin can be produced by a conventional method, e.g., polymerization of an aldehyde such as formaldehyde, paraformaldehyde or acetaldehyde, polymerization of trioxane, or copolymerization of trioxane with a cyclic ether such as ethylene oxide, propylene oxide or 1,3-dioxolane.

In the present invention, among the polyacetal resins, a polyacetal resin having a melt index of 3.0 or less is used. When a polyacetal resin having a melt index of more than 3.0 is used, a creep characteristic that the present invention intends to improve cannot be improved satisfactorily. The polyacetal resin having a melt index of 3.0 or less can be obtained by adjusting, generally reducing, the amount of chain transfer agent to be used in its production.

The term "melt index" used herein refers to a melt index measured in accordance with ASTM D238 at 190° C. under a load of 2,160 kg.

A silicone oil (B) used in the present invention is an important additive to improve creep rupture in a metal insert article of a polyacetal. In particular, a dimethyl silicone oil is desirable.

The molecular weight of the dimethyl silicone oil is preferably 20,000 to 100,000, particularly more preferably 30,000 to 70,000, in terms of dispersibility and ease of handling at the time of mixing into the polyacetal. When the molecular weight of the dimethyl silicone oil is lower than 20,000, heat resistance is unsatisfactory, while when the molecular weight is higher than 100,000, its dispersion in the polyacetal is poor, peeling and a decrease in weld strength occur, and ease of handling is also degraded disadvantageously.

Further, the silicone oil (B) exhibits its effect with a trace amount. Its amount in the composition is 0.05 to 3.0 wt %, preferably 0.1 to 1.0 wt %. When the amount is less than 0.05 wt %, an improvement in a creep rupture life in the metal insert article of the polyacetal resin cannot be seen, while when the amount is more than 3.0 wt %, the mechanical strength and weld strength of the polyacetal resin deteriorate disadvantageously.

An elastomer (C) used in the present invention, together with the silicone oil (B), significantly improves the creep rupture life in the metal insert molding of the polyacetal. The elastomer (C) desirably has a good affinity for the polyacetal resin and excellent compatibility with the polyacetal resin. From the viewpoint of the compatibility, as the elastomer (C), a core/shell polymer comprising a thermoplastic polyurethane elastomer or rubber-like polymer as a core and a glass-like polymer as a shell is particularly preferred.

The thermoplastic polyurethane elastomer may have a branched structure as well as a linear structure or may be crosslinked as far as thermoplasticity can be maintained. Of these polyurethane resins, a thermoplastic polyurethane elastomer resulting from reaction of a diisocyanate component with a diol component such as polyoxyalkylene glycol or a polyester diol containing a polyoxyalkylene glycol unit is desirable.

Illustrative examples of the diisocyanate component include an aliphatic isocyanate (such as 1,6-hexamethylene diisocyanate), an alicyclic diisocyanate (such as isophorone diisocyanate), and an aromatic diisocyanate (such as 2,4-toluene diisocyanate).

Illustrative examples of the diol component include an alkylene diol, a polyoxyalkylene diol, and a polyester diol.

The core/shell polymer having a rubber-like polymer core and a glass-like polymer shell can be prepared by a known method. Alternatively, a commercial product can be used as the core/shell polymer. Representative examples thereof include ACRYLOID KM330 and ACRYLOID KM653 of Rohm & Haas Company, PARALOID KCA-102 and PARALOID KCA-301 of KUREHA CHEMICAL INDUSTRY CO., LTD., STAFILOID PO-0198 and STAFILOID PO-0820 of GANZ CHEMICAL CO., LTD., KANEACE FM of KANEKA CORPORATION, and METABRANE C-102, METABRANE E-901, METABRANE W-800 and METABRANE S-2001 of MITSUBISHI RAYON CO., LTD. Preferable out of these core/shell polymers is a core/shell polymer comprising a rubber-like polymer as a core and a glass-like polymer composed essentially of methyl methacrylate as a shell, particularly a core/shell polymer in which anions are substantially not detected. When a core/shell polymer in which anions are detected is used, it may accelerate decomposition of the polyacetal at the time of melt-kneading or injection molding, and desired properties may not be obtained accordingly. Further, melt-kneading may be impossible to perform due to excessive decomposition. The core/shell polymer in which anions are substantially not detected refers to a core/shell polymer in which anions are not detected by a general qualitative test of anions. For instance, the presence of anions can be confirmed by a method (qualitative test of sulfate ions) in which 5 g of a sample (core/shell polymer) is weighed into a 50-ml Erlenmeyer flask, 20 ml of ion exchange water is added, the mixture is stirred by means of a magnetic stirrer for 3 hours and then filtered by use of a No5C filter paper, the resulting filtrate is divided into two portions, 0.5 ml of 1% barium chloride aqueous solution is added to one of the portions, and occurrence of turbidity is compared and observed or a method (qualitative test of halogen ions) in which the same steps as in the above method are carried out, a 0.1N silver nitrate aqueous solution is added in place of the 1% barium chloride aqueous solution, and occurrence of turbidity is compared. Preferably, a core/shell polymer which is completely free from these anions is suitably used.

A core/shell polymer which is preferably used in the present invention is one obtained by emulsion polymerization using a nonionic surfactant and a polymerization initiator which produces a neutral radical. The core/shell polymer can be produced by, for example, an emulsion polymerization technique described in JP-A 3-14856. The emulsion polymerization can be carried out by use of the following surfactants and polymerization initiators, for example. As the nonionic surfactant, most of widely and generally used nonionic surfactants including ether-type nonionic surfactants such as polyoxyethylene nonylphenyl ether, polyoxyethylene stearyl ether and polyoxyethylene lauryl ether; ester-type nonionic surfactants such as polyoxyethylene monostearate; sorbitan-ester-type nonionic surfactants such as polyoxyethylene sorbitan monolaurate; and block-copolymer-type nonionic surfactants such as a polyoxyethylene polyoxypropylene block copolymer can be used. Its amount to be added is selected as appropriate according to the particle stabilization capability of the surfactant. As the polymerization initiator, an azo polymerization initiator such as azobisisobutyronitrile, dimethyl 2,2'-azobisisobutyrate or 2,2'-azobis(2-aminopropane) dihydrochloride or a peroxide polymerization initiator such as cumene hydroperoxide, diisopropyl benzene hydroperoxide or hydrogen peroxide can be used alone or in combination of two or more. Thus, when the emulsion polymerization is carried out in the presence of the anion-free surfactant in a reaction system which is not a persulfate, a core/shell polymer which contains substantially no anions or contains only a trace amount of anions can be obtained.

The core/shell polymer used in the present invention comprises a rubber-like polymer as a core and a glass-like polymer as a shell and is obtained by seed emulsion polymerization, generally, continuous multi-step emulsion polymerization in which a polymer in a preceding step is covered with a polymer in the subsequent step successively. When the core/shell polymer has an intermediate phase to be described later, the intermediate phase may be formed by multi-step emulsion polymerization in which a polymer in a subsequent step enters a polymer in the preceding step. At the time of particle production polymerization, an emulsion polymerization reaction is preferably initiated by charging monomers, a surfactant and water into a reactor and then adding a polymerization initiator thereto. First polymerization is a reaction for forming the rubber-like polymer.

Illustrative examples of monomers constituting the rubber-like polymer include a conjugated diene, an alkyl acrylate having an alkyl group of 2 to 8 carbon atoms, and a mixture thereof. These monomers are polymerized to form the rubber-like polymer. These monomers are polymerized to form a rubber-like polymer having a glass transition temperature of not higher than −30° C. Illustrative examples of such a conjugated diene include butadiene, isoprene and chloroprene. Illustrative examples of the alkyl acrylate having an alkyl group having 2 to 8 carbon atoms include ethyl acrylate, propyl acrylate, butyl acrylate, cyclohexyl acrylate, and 2-ethylhexyl acrylate. For the rubber-like polymer, butyl acrylate is particularly preferably used. In the first polymerization, monomers copolymerizable with the conjugated diene and the alkyl acrylate, such as an aromatic vinyl and an aromatic vinylidene, e.g., styrene, vinyltoluene and α-methylstyrene, a vinyl cyanide and a vinylidene cyanide, e.g., acrylonitrile and methacrylonitrile, and an alkyl methacrylate, e.g., methyl methacrylate and butyl methacrylate can be copolymerized. When the first polymerization does not involve the conjugated diene or when the amount of the conjugated diene in the first polymerization is 20 wt % or less of a total amount of monomers in the first polymerization, a polymer having high shock resistance can be obtained by use of small amounts of crosslinkable monomer and graftable monomer. Illustrative examples of the crosslinkable monomer include aromatic divinyl monomers such as divinylbenzene, and alkane polyol polyacrylates and alkane polyol polymethacrylates such as ethylene glycol diacrylate, ethylene glycol dimethacrylate, butylene glycol diacrylate, hexanediol diacrylate, hexanediol dimethacrylate, oligoethylene glycol diacrylate, oligoethylene glycol dimethacrylate, trimethylolpropane diacrylate, trimethylolpropane dimethacrylate, trimethylolpropane triacrylate, and trimethylolpropane trimethacrylate. Particularly, butylene glycol diacrylate and hexanediol diacrylate are preferably used. Illustrative examples of the graftable monomer include unsaturated carboxylic allyl esters such as allyl acrylate, allyl methacrylate, diallyl maleate, diallyl fumarate, and diallyl itaconate. Particularly, allyl methacrylate is preferably used. Such crosslinkable and graftable monomers each are used in an amount of 0 to 5 wt %, preferably 0.1 to 2 wt % of a total amount of monomers in the first polymerization.

The rubber-like polymer core preferably constitutes 50 to 90 wt % of the whole core/shell polymer. When the weight of the core is less than or more than the weight range, the shock resistance improving effect of a resin composition obtained by melt-mixing the produced core/shell polymer may not be satisfactory. As the outermost shell layer (shell phase), a glass-like polymer is formed. A monomer constituting the glass-like polymer is a mixture of methyl methacrylate and a monomer copolymerizable with methyl methacrylate and forms a glass-like polymer having a glass transition temperature of not lower than 60° C. Illustrative examples of the monomer copolymerizable with methyl methacrylate include vinyl polymerizable monomers such as an alkyl methacrylate, e.g., ethyl methacrylate and butyl methacrylate, an alkyl acrylate, e.g., ethyl acrylate and butyl acrylate, an aromatic vinyl and an aromatic vinylidene, e.g., styrene, vinyltoluene and a-methylstyrene, and a vinyl cyanide and a vinylidene cyanide, e.g., acrylonitrile and methacrylonitrile. Particularly preferably, ethyl acrylate, styrene and acrylonitrile are used. The outermost shell layer (shell phase) preferably constitutes 10 to 50 wt % of the whole core/shell polymer. Further, an intermediate phase may exist between a first polymer phase and a last polymer phase. For example, the intermediate phase is formed by seed emulsion polymerization of a polymerizable monomer having a functional group such as glycidyl methacrylate, methacrylic acid or hydroxyethyl methacrylate, a polymerizable monomer which forms a glass-like polymer such as methyl methacrylate, a polymerizable monomer which forms a rubber-like polymer such as butyl acrylate. Such an intermediate phase can be selected as appropriate according to the characteristic of a desired core/shell polymer. Further, its polymerization ratio is also selected as appropriate according to monomers to be used. For example, when a glass-like polymer is the intermediate layer, its polymerization ratio is calculated as a portion of a shell, while when a rubber-like polymer is the intermediate layer, its polymerization ratio is calculated as a portion of a core.

A core/shell polymer having such an intermediate phase may have, for example, a multilayer structure in which another layer exists between a core and a shell or a salami structure in which an intermediate phase is dispersed in a core in particulate form. In a further extreme case of a core/shell polymer having the salami structure, an intermediate phase to be dispersed may form another core in a central portion of a core. A core/shell polymer having such a structure may be produced when a monomer represented by styrene is used as a monomer constituting an intermediate phase.

In the present invention, the foregoing elastomer (C) fully exhibits its effect with a trace amount. Its amount in the composition is 0.1 to 5.0 wt %, preferably 0.5 to 4.0 wt %. When the amount is less than 0.1 wt %, a significant improvement in a creep rupture life in a metal insert article of the polyacetal resin cannot be seen, while when the amount is more than 5.0 wt %, the mechanical strength of the polyacetal resin deteriorates disadvantageously.

The ultra high molecular weight polyethylene (D) in the present invention refers to a polyethylene obtained by significantly increasing the molecular weight of an ordinary high density polyethylene and having a weight average molecular weight of not lower than about 1,000,000. The ultra high molecular weight polyethylene is generally synthesized by a Ziegler process. However, its synthesis process is not particularly limited in the present invention. Illustrative examples of the ultra high molecular weight polyethylene include HIZEX MILLION of Mitsui Chemicals, Inc. and GUR MICROPOWDER of TICONA JAPAN CO., LTD. Further, since the ultra high molecular weight polyethylene is hardly soften and molten when heated, the influence of its particle size on physical properties is not little. The ultra high molecular weight polyethylene (D) in the present invention preferably has an average particle diameter of 15 to 150 $\mu$m, more preferably 30 to 90 $\mu$m. When the average particle diameter is smaller than 15 $\mu$m, an effect of improving a heat aging cracking life in a metal insert article is small, and the occurrence of black foreign matter is observed in the molding disadvantageously, while when the average particle diameter is larger than 150 $\mu$m, the molding has a poor appearance and is therefore unsuitable for actual use.

Further, the ultra high molecular weight polyethylene (D) fully exhibits its effect with a trace amount. Its amount in the composition is 0.1 to 5.0 wt %, preferably 0.5 to 4.0 wt %. When the amount is less than 0.1 wt %, a significant improvement in a creep rupture life in a metal insert article of the polyacetal resin is not seen, while when the amount is more than 5.0 wt %, the mechanical strength of the polyacetal resin deteriorates disadvantageously.

Further, the total amount of (C) and (D) in the whole composition is preferably 2.0 to 7.0 wt %, particularly preferably 3.0 to 5.0 wt %. Combined use of the elastomer (C) and the ultra high molecular weight polyethylene (D) causes a synergistic effect, so that the creep rupture life in the metal insert article of the polyacetal resin is improved with the aforementioned total amount of the components (C) and (D). However, when the total amount of (C)+(D) is 2.0 wt % or more, their effect becomes significant, and the creep rupture life is unexpectedly improved. Meanwhile, when the total amount of (C)+(D) is more than 7.0 wt %, the mechanical strength of the polyacetal resin deteriorates disadvantageously.

Further, it is preferable to add a stabilizer for improving heat stability to the resin composition of the present invention. Illustrative examples of the stabilizer include a hindered phenol-based antioxidant, various nitrogen-containing compounds and fatty acid metal salts.

Further, as required, one or more of commonly used additives such as an ultraviolet absorber, a lubricant, a mold releasing agent, colorants including a dye and a pigment, and a surfactant can also be added.

A specific example of applications of a metal insert molding using the resin composition of the present invention is a through anchor for an automobile. In this case, since the through anchor is used in the automobile, it is particularly preferable to add, as a weathering stabilizer, one or two or more of compounds selected from an ultraviolet absorber and a light stabilizer. Illustrative examples of the ultraviolet absorber include 1,3,5-tris(2'-hydroxyphenyl)triazine and 2-[2'-hydroxy-5'-methyl-3'-(3",4",5",6"-tetrahydrophthal imideylomethyl)phenyl]benzotriazole. Illustrative examples of the light stabilizer include HALS. Specific examples thereof include (2,2,6,6-tetramethyl-4-pipezylsebacate) and bis(1,2,2,6,6-pentamethyl-4-piperidylsebacate).

The composition of the present invention is prepared easily by a known method which is generally used as a conventional resin composition preparation method. For example, there can be used any of a method in which the components are mixed together and then kneaded and extruded into pellets by means of an extruder, a method in which pellets of different compositions are prepared once, predetermined amounts of the pellets are mixed together and molded, and a molding of target composition is obtained after the molding, and a method in which one or two or more of the components are directly charged into a molding machine.

The polyacetal resin composition of the present invention is suitable for use in metal insert moldings in particular. The metal insert moldings refer to all moldings prepared by placing a metal part in the core of a mold in advance and then injection-molding a resin thereinto so as to integrate the metal part with the resin and are not particularly limited by shapes or the like. In general, creep rupture is liable to occur in a metal insert molding having such a shape that a portion of a metal part is covered with a resin. Therefore, the polyacetal resin of the present invention is useful particularly for a molding having such a shape.

Effect of the Invention

The polyacetal resin composition of the present invention significantly improves a creep rupture life in a metal insert article molded from a polyacetal resin and can be used in use of a polyacetal resin in a metal insert molding stably for a long time and can be used for a through anchor for automobiles.

EXAMPLES

Hereinafter, the present invention will be described in more detail based on Examples and Comparative Examples. However, the present invention shall not be limited by these Examples. Examples 1 to 6 and Comparative Examples 1 to 7

Polyacetal resins (A), silicon oils (B), elastomers (C) and ultra high molecular weight polyethylenes (D) of types shown in Table 1 were mixed together in amounts shown in Table 1 and then melt-kneaded at 200° C. by a 30-mm twin-screw extruder so as to prepare pellets. Then, using the polyacetal resin composition pellets, metal insert articles are molded and evaluated.

Creep characteristics of the metal insert moldings were evaluated in the following manner.

Figure 2:
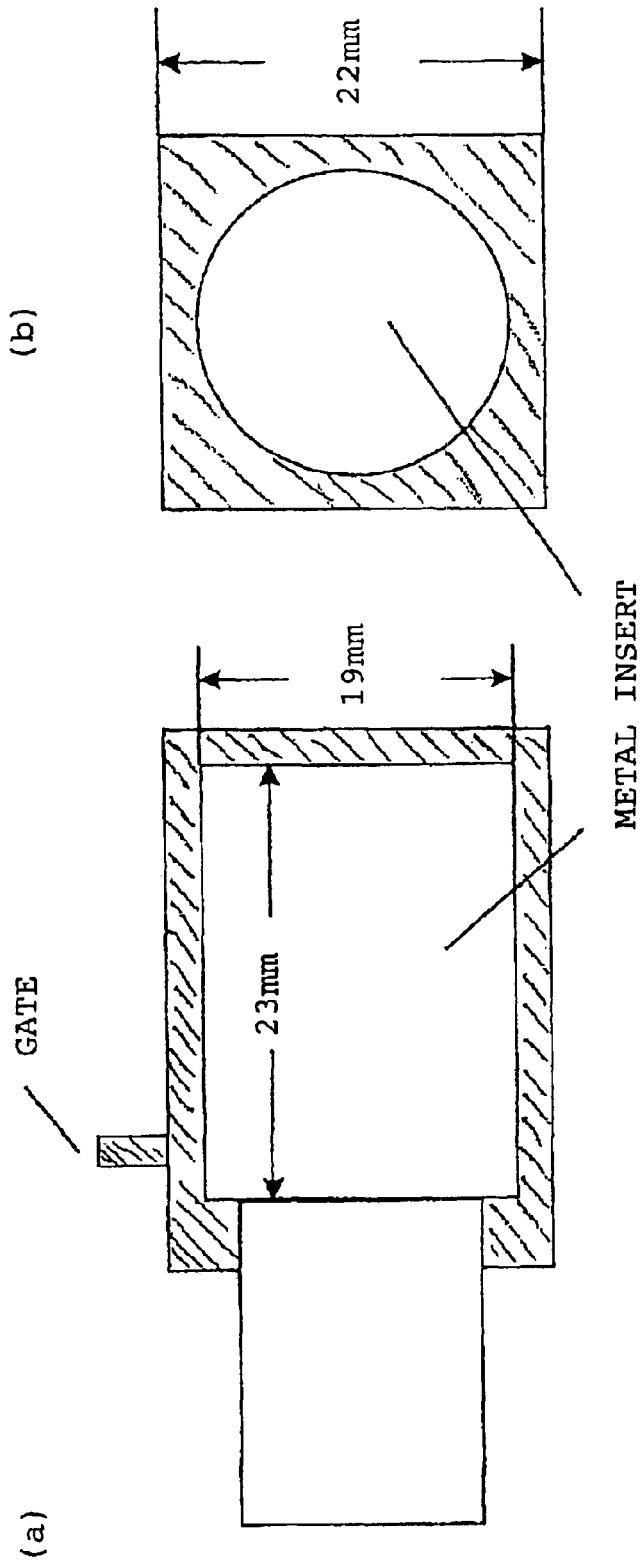
FIG. 2 is a diagram showing the shape of a metal insert molding used in Examples wherein (a) is a front view, and (b) is a right side view.

<Shape of Molded Article> shape of metal insert (shown in FIG. 1)

shape of metal insert molding (shown in FIG. 2)

<Molding Conditions> molding machine: J75SA of JSW cylinder set temperature (° C.): 200 [NH]–200 [$C_1$]–180 [$C_2$]–160[$C_3$]

mold temperature: 85° C.

molding cycle: 35 seconds (injection dwell pressure: 25 seconds, cooling: 10 seconds)

<Measurement of Rupture Time>

The foregoing metal insert molding was left to stand in a gear oven set at 120° C., and time taken to have cracks in the resin portion was measured.

<Materials for Preparing Composition>

(A) Polyacetal Resin (A-1) JURACON M25-44 (melt index: 2.5) of POLYPLASTICS CO., LTD.

(A-2) JURACON M90-44 (melt index: 9.0) of POLYPLASTICS CO., LTD.

(B) Silicone Oil (B-1) dimethyl silicone: SH-200/(B)NL0078 (molecular weight: 60,000) of Toray Dow Corning Toray Silicone Co., Ltd.

(B-2) dimethyl silicone: SH-200/(B)NL0080 (molecular weight: 30,000) of Toray Dow Corning Toray Silicone Co., Ltd.

(C) Elastomer (C-1) thermoplastic polyurethane elastomer: MIRACTORAN E375MSJP-1 of NIPPON MIRACTORAN CO., LTD.

(C-2) core/shell polymer: STAFILOID PO-0198 of GANZ CHEMICAL CO., LTD.

(D) Ultra High Molecular Weight Polyethylene (D-1) ultra high molecular weight polyethylene: GUR4186 (average particle diameter: 60 $\mu$m) of TICONA JAPAN CO., LTD.

(D-2) ultra high molecular weight polyethylene: GUR2126 (average particle diameter: 30 $\mu$m) of CHIKONA JAPAN CO., LTD.

TABLE 1-(1)

| | | | Ex. 1 | Ex. 2 | Ex. 3 | Ex. 4 | Ex. 5 | Ex. 6 |
|---|---|---|---|---|---|---|---|---|
| Composition (wt. %) | (A) | Polyacetal resin (A-1) | 97.0 | 94.5 | 94.5 | 94.5 | 94.0 | 96.5 |
| | | Polyacetal resin (A-2) | | | | | | |
| | (B) | Silicone oil (B-1) | 0.5 | 0.5 | | 0.5 | 1.0 | 0.5 |
| | | Silicone oil (B-2) | | | 0.5 | | | |
| | (C) | Polyurethane elastomer (C-1) | 1.5 | 3.0 | 3.0 | | 3.0 | |
| | | Core/shell polymer (C-2) | | | | 3.0 | | 1.0 |
| | (D) | Ultra high molecular weight polyethylene (D-1) | 1.0 | 2.0 | | | 2.0 | 2.0 |
| | | Ultra high molecular weight polyethylene (D-2) | | | 2.0 | 2.0 | | |
| Rupture time of metal insert molded article (hrs) | | | 2100 | 2300 | 2200 | 2300 | 2400 | 2100 |

TABLE 1-(2)

| | | | Com. Ex. 1 | Com. Ex. 2 | Com. Ex. 3 | Com. Ex. 4 | Com. Ex. 5 | Com. Ex. 6 | Com. Ex. 7 |
|---|---|---|---|---|---|---|---|---|---|
| Composition (wt. %) | (A) | Polyacetal resin (A-1) | 100 | | 99.0 | 96.5 | 97.0 | 98.0 | 98.5 |
| | | Polyacetal resin (A-2) | | 94.5 | | | | | |
| | (B) | Silicone oil (B-1) | | 0.5 | 1.0 | | | 0.5 | 0.5 |
| | | Silicone oil (B-2) | | | | | | | |
| | (C) | Polyurethane elastomer (C-1) | | 3.0 | | 3.5 | | 1.5 | |
| | | Core/shell polymer (C-2) | | | | | | | 1.0 |
| | (D) | Ultra high molecular weight polyethylene (D-1) | | 2.0 | | | 3.0 | | |
| | | Ultra high molecular weight polyethylene (D-2) | | | | | | | |
| Rupture time of metal insert molded article (hrs) | | | 400 | 700 | 700 | 700 | 900 | 1700 | 1200 |

What is claimed is:

1. A polyacetal resin composition comprising:

(A) polyacetal resin having a melt index of 3.0 or less, (B) 0.05 to 3.0% by weight per the composition of silicone oil, (C) 0.5 to 4.0% by weight per the composition of an elastomer and (D) 0.5 to 4.0% by weight per the composition of ultrahigh-molecular weight polyethylene, wherein the total amount of the elastomer (C) and the ultrahigh-molecular weight polyethylene (D) is 2.0 to 7.0% by weight of the composition.

2. The polyacetal resin composition according to claim 1, wherein the silicone oil (B) is dimethylsilicone having a molecular weight of from 20,000 to 100,000.

3. The polyacetal resin composition according to claim 1, wherein the elastomer (C) is a thermoplastic polyurethane elastomer.

4. The polyacetal resin composition according to claim 1, wherein the elastomer (C) is a core/shell polymer having the core of a rubber-like polymer and the shell of a glass-like polymer.

5. The polyacetal resin composition according to claim 1, wherein the ultrahigh-molecular weight polyethylene (D) is a substance in the form of particles having an average particle size of 15 to 150 μm.

6. A metal insert molding which includes a molded part comprised of the polyacetal resin composition defined in claim 1, and a metal part united to the molded part by means of an insert molding.

7. The metal insert molding according to claim 6, in the form of a through anchor for automobiles.

* * * * *